(12) United States Patent
Steinbrenner et al.

(10) Patent No.: US 12,389,912 B2
(45) Date of Patent: Aug. 19, 2025

(54) MICROPARTICLE COMPOSITIONS COMPRISING SAFLUFENACIL

(71) Applicant: BASF AGRO B.V., Arnhem (NL)

(72) Inventors: Ulrich Steinbrenner, Ludwigshafen (DE); Joerg Steuerwald, Limburgerhof (DE); Katharine Klamczynski, Limburgerhof (DE); Wolfgang Laik, Neustadt (DE)

(73) Assignee: BASF AGRO B.V., Arnhem (NL)

( * ) Notice: Subject to any disclaimer, the term of this patent is extended or adjusted under 35 U.S.C. 154(b) by 905 days.

(21) Appl. No.: 17/610,500

(22) PCT Filed: May 27, 2020

(86) PCT No.: PCT/EP2020/064626
§ 371 (c)(1),
(2) Date: Nov. 11, 2021

(87) PCT Pub. No.: WO2020/244978
PCT Pub. Date: Dec. 10, 2020

(65) Prior Publication Data
US 2022/0240507 A1 Aug. 4, 2022

(30) Foreign Application Priority Data
Jun. 7, 2019 (EP) .................................. 19179063

(51) Int. Cl.
*A01N 43/54* (2006.01)
*A01N 25/10* (2006.01)
*A01P 13/00* (2006.01)

(52) U.S. Cl.
CPC ............. *A01N 43/54* (2013.01); *A01N 25/10* (2013.01); *A01P 13/00* (2021.08)

(58) Field of Classification Search
CPC .................................................... A01N 25/10
See application file for complete search history.

(56) References Cited

U.S. PATENT DOCUMENTS

| 4,557,755 A * | 12/1985 | Takahashi ................ B01J 13/18 |
| | | 514/936 |
| 11,317,628 B2 * | 5/2022 | Noller ..................... A01N 25/28 |
| 2018/0249712 A1 | 9/2018 | Noller et al. |
| 2018/0297001 A1 | 10/2018 | Winkelmann et al. |

FOREIGN PATENT DOCUMENTS

| WO | WO-01/083459 A2 | 11/2001 |
| WO | WO-2011/023758 A2 | 3/2011 |
| WO | WO-2011/023759 A2 | 3/2011 |
| WO | WO-2017/037210 A1 | 3/2017 |

OTHER PUBLICATIONS

Mollet et al., Formulation Technology, 1st ed., Wiley-VCH Verlag GmbH Weinheim, Chapters 6.4 and 14.2.2 (2001).
International Application No. PCT/EP2020/064626, International Search Report and Written Opinion, mailed Jul. 31, 2020.
International Application No. PCT/EP2020/064626, International Preliminary Report on Patentability, mailed Sep. 30, 2021.

* cited by examiner

*Primary Examiner* — Gina C Justice
(74) *Attorney, Agent, or Firm* — MARSHALL, GERSTEIN & BORUN LLP

(57) ABSTRACT

A microparticle composition comprising saflufenacil, wherein saflufenacil is present in the form of microparticles, which comprise solid saflufenacil, which is surrounded or embedded by an aminoplast polymer, which is a polycondensation product of one or more amino compounds and one or more aldehydes, and further comprising at least one lignin based sulfonic acid A, such as lignosulfonic acid, ethoxylated lignosulfonic acid or oxidized lignins, wherein said lignosulfonic acid A has an average molar weight MW of at least 10,000 Da.

16 Claims, No Drawings

MICROPARTICLE COMPOSITIONS COMPRISING SAFLUFENACIL

CROSS-REFERENCE TO RELATED APPLICATIONS

This is the U.S. national phase of International Application No. PCT/EP2020/064626, filed May 27, 2020, which claims the benefit of European Patent Application No. 19179063.3, filed on Jun. 7, 2019.

The present invention relates to microparticle compositions comprising saflufenacil, to a method of their preparation and to the use of these microparticle compositions for controlling undesired vegetation.

Saflufenacil is the INN common name of the herbicidally active phenyl uracil compound 2-chloro-5-[3,6-dihydro-3-methyl-2,6-dioxo-4-(trifluoromethyl)-1-(2H)pyrimidinyl]-4-fluoro-N-[[methyl(1-methylethyl)amino]sulfonyl]benzamide.

Saflufenacil has been described for the first time in WO 01/083459.

Saflufenacil is a highly active herbicide which efficiently inhibits growth of undesirable vegetation at low application rates. Unfortunately, its selectivity is not always satisfactory and its use in crops is somewhat limited. Moreover, the saflufenacil does not have sufficient residual activity and thus regrowth may occur shortly after it has been applied.

Herbicides, such as saflufenacil, are normally applied in the form of dilute aqueous spray liquors, which are prepared by diluting a concentrate formulation of the herbicide with water. For this purpose, pesticide compounds may be formulated in solid forms, such as wettable powders (WP) and water-dispersible granules (WG), as well as in liquid forms, such as emulsions, emulsifiable concentrates (EC), suspoemulsions (SE) or suspension concentrates (SC). For efficient encapsulation, it is of particular importance that the formulations can be easily diluted with water and that the dilution remains stable for a certain time without separation of the active ingredient, as this may cause clogging of the spraying nozzles. For ecological reasons it is preferred that the formulation does not contain large amounts of organic solvents, which principally favors solid formulations and aqueous SC formulations.

Despite the aforementioned advantages associated with the usage of SCs, there are a number of problems known to the skilled person which are sometimes encountered with SCs as a result of settling during prolonged storage or storage at elevated temperatures, the resistance of settled particles to re-suspension and the formation of crystalline material upon storage. As a consequence, the formulations may be difficult to handle and the bioefficacy may be inconsistent.

When trying to formulate saflufenacil one faces several problems. Saflufenacil carries a N-amino-sulfonylcarboxamide side-chain which might undergo hydrolysis at basic pH values. Apart from that, saflufenacil is capable of existing in different crystalline and non-crystalline modifications, namely amorphous forms, crystalline hydrates and a crystalline anhydrate, which may undergo uncontrolled conversion into another crystalline form. This conversion in turn may lead to coarsening of the saflufenacil particles, in particular when formulated as suspension concentrate. These factors might result in a reduced chemical and physical stability of the formulations, an effect that is particularly pronounced when the formulations are stored over prolonged periods of time and/or at elevated temperatures. Said factors may also lead to poor dilution properties as the coarse saflufenacil particles are prone to separate from the diluted formulation.

Several stable aqueous agricultural formulations of saflufenacil have been described so far. WO 2011/023759 describes an aqueous suspension concentrate formulation containing saflufenacil-anhydrate and a combination of certain anionic and non-ionic surfactants. WO 2011/023758 describes an aqueous suspension concentrate formulation of saflufenacil which additionally contains glyphosate as a co-herbicide.

Although, these formulations are stable, they do not solve the problem of poor crop selectivity and insufficient residual activity.

It is principally known to provide pesticidally active compounds in the form of microcapsule formulations (see H. Mollet, A. Grubenmann "Formulation Technology" 1st ed., Wiley-VCH Verlag GmbH, Weinheim 2001, Chapter 6.4 and Chapter 14.2.2). Microencapsulation can be principally achieved by coacervation techniques, spray drying, fluidized-bed coating, electrostatic microencapsulation or in-situ polymerization. These techniques provide active compound particles, wherein the active compound is surrounded by a polymeric wall material.

WO 2017/037210 discloses microparticle compositions of saflufenacil.

Although microencapsulation may improve the acute toxicity of a pesticide or reduce degradation, it is often difficult to achieve. In particular, aggregation of the pesticide particles during or after encapsulation is the main problem, if one encapsulation method, which may work for a particular pesticide compound, does not necessarily work for another pesticide compound. When trying to encapsulate a solid material in an aqueous suspension of the solid material by an in-situ-polymerization technique, the solid material tends to agglomerate thereby forming large particles of active ingredient particles, which are embedded in the polymer matrix. A thus obtained suspension is usually no longer suitable for agricultural use. So fat, it was not possible to efficiently encapsulate solid pesticide particles by using small amounts of an encapsulating polymer.

One challenge of known formulations of saflufenacil is to increase the compatibility with other pesticides.

SUMMARY OF INVENTION

It is an object of the present invention to provide a formulation of saflufenacil that is compatible with a broad range of other pesticides, especially other tank mix partners which are commonly combined with saflufenacil, such as glyphosate, glufosinate, dicamba etc. . . . Furthermore, it should show both high physical and chemical stability over prolonged storage periods while maintaining its biological efficacy. Moreover, it should also be compatible with tank-mix partners which are commonly combined with saflufenacil. Upon dilution with water, the formulation should give a stable aqueous composition of saflufenacil without forming coarse material or a supernatant liquid. It was surprisingly found that the objective could be achieved by microparticle compositions of solid saflufenacil, wherein solid saflufenacil is surrounded or embedded by an aminoplast polymer, and further comprising at least one lignin based sulfonic acid A, such as lignosulfonic acid, ethoxylated lignosulfonic acid or oxidized lignins, wherein said lignosulfonic acid A has an average molar weight MW of at least 10,000 Da.

In the microparticle compositions of the present invention, saflufenacil is less prone to degradation. Thus, the microparticle compositions of the present invention provide for both high physical and chemical stability over prolonged storage periods, while maintaining the biological efficacy of saflufenacil. Moreover, microparticle compositions of the present invention can be easily formulated. Furthermore, microparticle compositions of the present invention in the form of aqueous suspensions provide for improved tank-mix compatibility, and thus can be readily tank mixed with other formulations of pesticides and do not negatively interact with other formulations regarding their dilution stability.

It was also surprisingly found that solid saflufenacil can be efficiently microencapsulated by using aminoplast pre-condensates and performing the process described hereinafter. Therefore, a second aspect of the present invention relates to a process for preparing the microparticle compositions as described herein, which process comprises the following steps:

i) providing an aqueous suspension of solid saflufenacil particles;
ii) adding an aminoplast pre-condensate to the aqueous suspension of the saflufenacil particles;
iii) effecting the polycondensation of the aminoplast pre-condensate, e.g. by heating the aqueous suspension of step ii) at a pH, where the polycondensation of the aminoplast pre-condensate will occur at the reaction temperature.

This process results in a stable aqueous suspension, wherein saflufenacil is present in the form of microparticles, which comprise solid saflufenacil, which is surrounded or embedded by an aminoplast polymer. From this, the microparticles can be isolated, if necessary. Surprisingly, this process does not result in significant agglomeration of the saflufenacil particles, as was observed for other in-situ polymerization techniques.

DETAILED DESCRIPTION OF INVENTION

In the microparticle composition of the invention saflufenacil is present in the form of microparticles, which comprise solid saflufenacil as a core material, said composition further comprising at least one lignin based sulfonic acid A, such as lignosulfonic acid, ethoxylated lignosulfonic acid or oxidized lignins, wherein said lignosulfonic acid A has an average molar weight MW of at least 10,000 Da. In the microparticles solid saflufenacil forms the core material which is surrounded or embedded by at least one aminoplast polymer. In this context, it has to be understood that the aminoplast polymers may form a regular or irregular shell which surrounds or embeds the core material. The microparticles may have a single solid core formed by the saflufenacil and a shell or matrix formed by the aminoplast polymer. It may, of course, also be possible that the microparticles have a "domain structure" which comprises a certain number of solid saflufenacil particles, e.g. 3 to 1000 or 10 to 500, of amorphous or crystalline saflufenacil, which are embedded by the aminoplast polymer.

It is not necessary that the aminoplast polymer forms a completely closed shell. Frequently, however, the shell will completely surround the core material like a membrane, thereby forming a barrier between the core material and the surrounding material.

Aminoplast polymers, which are also termed amino resins, amino condensation resins or amido resins are polycondensation products of one or more aldehydes, such as formaldehyde, acetaldehyde, propanal, glyoxal or glutaraldehyde, with one or more amino compounds having usually at least two primary amino groups, such as urea, thiourea, melamine, which may be wholly or partially etherified, cyanoguanamine (=dicyandiamide) and benzoguanamine. Examples of aminoplast polymers are polycondensates of melamine and formaldehyde (melamine-formaldehyde resins or MF resins), including resins derived from wholly or partially etherified melamine formaldehyde condensates, urea-formaldehyde resins (UF resins), thiourea formaldehyde resins (TUF resins), polycondensates of melamine, urea and formaldehyde (MUF resins), including resins derived from wholly or partially etherified melamine-ureaformaldehyde condensates, polycondensates of melamine, thiourea and formaldehyde (MTUF resins, including resins derived from wholly or partially etherified melaminethiourea-formaldehyde condensates, urea-glutaraldehyde resins, benzoguanamineformaldehyde polycondensates, dicyandiamide formaldehyde polycondensates and urea-glyoxal polycondensates. Suitable aminoplast polymers for microencapsulation are known and can be found, inter alia, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197. In UF and TUF resins, the molar ratios of urea or thiourea to formaldehyde are generally in the range from 1:0.8 to 1:4, in particular from 1:1.5 to 1:4, especially from 1:2 to 1:3.5. If glutaraldehyde is used instead of formaldehyde, the molar ratios of urea or thiourea to glutaraldehyde may in particular be in the range from 1:1.2 to 1:3, especially in the range from 1:1.5 to 1:2.5.

In MF and MUF resins, the molar ratios of melamine to formaldehyde are generally in the range from 1:1.5 to 1:10, in particular from 1:3 to 1:8 preferably 1:4 to 1:6.

In MUF and MTUF resins, the molar ratios of melamine+ urea or thiourea to formaldehyde are generally in the range from 1:0.8 to 1:9, in particular from 1:2 to 1:8; preferably 1:3 to 1:6. The molar ratio of urea or thiourea to melamine may be in the range from 50:1 to 1:100 and in particular from 30:1 to 1:30.

In the preparation of the aforementioned aminoplast resins, the pre-condensates may be used in the form of etherified pre-condensates of amino compound and aldehyde. In these etherified pre-condensates the methylol groups formed by the reaction of the amino groups with formaldehyde with an alkanol or an alkane diol, in particular with a C1-C4-alkanol, such as methanol, ethanol, n-propanol or n-butanol, in particular methanol, or a C2-C4-alkandiol, such as ethylene glycol. The degree of etherification of these resins can be adjusted by the molar ratio of amino groups to alkanol which is typically in the range from 10:1 to 1:10, preferably in the range from 2:1 to 1:5.

The aminoplast polymer material, which surrounds or embeds the solid saflufenacil, is most preferably selected from the group consisting of melamine-formaldehyde resins, including melamine-formaldehyde resins derived from wholly or partially etherified melamine-formaldehyde condensates, and urea-formaldehyde resins and mixtures thereof. Especially, the aminoplast polymer material, which surrounds or embeds the solid saflufenacil, is a melamine-formaldehyde resin, in particular a melamine formaldehyde resin, which is derived from wholly or partially etherified melamine formaldehyde condensates, which may contain small amount, e.g. 1 to 20 mol.-%, based on melamine, of urea.

In the microparticle compositions of the invention, the amount of aminoplast polymer material, which surround or embed the solid saflufenacil, will generally not exceed the amount of saflufenacil contained in the composition and is preferably at most 40% by weight, in particular at most 35% by weight and especially at most 30% by weight or at most 25% by weight, based on the total amount of saflufenacil and aminoplast polymers. The amount of aminoplast polymer material, which surround or embed the solid saflufenacil, is preferably from 0.5 to 40% by weight, in particular from 1 to 35% by weight and especially from 5 to 25% by weight, based on the total capsule weight, i.e. based on the total amount of saflufenacil and aminoplast polymers. The polymer material of the microparticle composition of the invention, which surrounds or embeds the solid saflufenacil, may comprise further water-insoluble polymers. However, the amount of such polymers will generally not exceed 20% of the total amount of encapsulating polymer material and will preferably not exceed 10% by weight of the total amount of polymer material, which surrounds or embeds the solid saflufenacil.

The solid saflufenacil, which is surrounded or embedded by at least one aminoplast polymer, may be any known form of solid saflufenacil, including amorphous saflufenacil and in particular crystalline saflufenacil, e.g. the crystalline anhydrate of saflufenacil as described in WO 08/043835 or a crystalline hydrate of saflufenacil as described in WO 08/043836.

In addition to the solid saflufenacil, the core material of the microparticles may contain an oil, e.g. a hydrocarbon solvent, such as an aromatic, paraffinic or isoparaffinic hydrocarbon, having preferably a boiling point above 100° C., a vegetable oil, such as corn oil, rapeseed oil, or a fatty acid ester, such as C1-C10-alkylester of a C10-C22-fatty acid, in particular methyl or ethyl esters of vegetable oils. such as rapeseed oil methyl ester or corn oil methyl ester. In a particular embodiment, the core material does not contain an oil as defined herein or less than 10% by weight, based on the weight of the core material, of an oil. In particular, the core does not contain an oil.

In addition to the solid saflufenacil, the core material of the microparticles may further contain a further pesticide compound, in particular a herbicide compound or a safener, having preferably a reduced water solubility, which generally does not exceed 10 g/l, in particular 5 g/l or even 1 g/l at 25° C. (deionized water). In particular, solid saflufenacil makes up at least 80%, in particular at least 90% of the pesticides contained in the microparticles.

The microparticles of the present invention are discrete particles having usually a particle size of less than 50 µm. Preferably, the particle size of the microparticles, i.e. their diameter, will in general not exceed 40 µm, preferably not exceed 35 µm and in particular not exceed 30 µm. The particle size given is the so called d90-value, which has to be understood as the value that is not exceeded by the diameters of at least 90% by weight of the microparticles. The microparticles have an average particle diameter, herein also termed d50-value, ranging from 1 to 25 µm, in particular from 1.5 to 20 µm, especially from 2 to 10 µm. The d50-value is defined as the value that is above the diameters of 50% by weight of the particles and below the diameters of 50% by weight of the particles. The d90 value as well as the d50 value can be calculated from the particle size distribution of the microparticles. Generally, the d10-value of the particles, i.e. the value of diameters which at least 10% by weight of the microparticles exceed, will be at least 0.5 µm and may e.g. be in the range from 0.5 µm 10 µm, in particular from 1 to 5 µm. The particle size distribution of the microparticles (i.e. the diameters) can be determined by conventional methods such as dynamic or static light scattering of an aqueous dispersion of the microparticle composition, e.g. at 25° C. and a concentration in the range of 0.1 to 1% by weight.

Microparticle compositions according to the invention contain at least one anionic polymeric surface-active substance A1, hereinafter also referred to as anionic polymeric surfactant A1 or polymeric surfactant A1, said at least one anionic polymeric surface-active substance A1 being a lignin based sulfonic acid A, wherein said lignin based sulfonic acid A1 has an average molar weight MW of at least 10,000 Da. Preferably, said lignin based sulfonic acid A1 has an average molar weight MW of 10,000 Da to 100,000 Da.

Preferably, said lignin based sulfonic acid A1 has a degree of sulfonation from 1.0 to 2.5 mol per kilogram of said lignosulfonic acid.

The average molar weight MW of said lignin based sulfonic acid as applied herein is determined by gel permeation chromatography according to DIN 55672-3.

The degree of sulfonation said lignin based sulfonic acid as applied herein is calculated from the sulfur content of said lignin based sulfonic acid as determined by atomic emission spectroscopy, from which the content of sulfate (determined according to DIN 38405-D5-2) is being subtracted.

Preferred lignin based sulfonic acids A1, are lignosulfonic acid, ethoxylated lignosulfonic acid or oxidized lignins.

Preferred lignin based sulfonic acids A1, are lignosulfonic acid, ethoxylated lignosulfonic acid or oxidized lignins.

In one embodiment, microparticle compositions according to the invention contain at least one anionic polymeric surface-active substance A2, surface-active substance A2 being homo- or copolymers of monoethylenically unsaturated monomers M1 having a sulfonic acid group optionally with one or more comonomers M2 different from monomers M1.

The anionic groups in these anionic polymeric surfactants may be partially or fully neutralized. Suitable counter ions are alkali metal ions, such as sodium, potassium, earth alkaline ions such as magnesium or calcium, and ammonium. In case of anionic polymeric surfactants having a sulfonate group, the anionic groups are preferably at least partly neutralized.

Preferably, the polymeric surfactant A2 is selected from homo- and copolymers made of
i) at least one monoethylenically unsaturated monomer M1 having a sulfonic acid group, such as vinylsulfonic acid, allylsulfonic acid, styrene sulfonic acid, vinyltoluene sulfonic acid, (meth)acrylate monomers having a sulfonic acid group, such as 2-acryloxyethylsulfonic acid, 2-acryloxypropylsulfonic or 4-acryloxybutylsulfonic acid, and (meth)acrylamide monomer having a sulfonic acid group, such as 2-acrylamidoethylsulfonic acid, 2-acrylamidopropylsulfonic acid or 2-acrylamido-2-methylpropane sulfonic acid
ii) and optionally one or more monoethylenically unsaturated comonomers M2 different from monomers M1, such as styrene, C1-C4-alkylacrylates, C1-C4-alkylmethacrylates, acrylamide, methacrylamide, acrylic acid, methacrylic acid, C1-C4-alkylacrylates, C1-C4-alkylmethacrylates.

In one embodiment, polymeric surfactant A2 is selected from homo- and copolymers made of
i) monomers M1, which are selected from (meth)acrylate monomers having a sulfonic acid group, such as 2-acryloxyethylsulfonic acid, 2-acryloxypropylsulfonic or 4-acryloxybutylsulfonic acid, and (meth)acrylamide monomer having a sulfonic acid group, such as 2-acrylamidoethylsulfonic acid, 2-acrylamidopropylsulfonic acid or 2-acrylamido-2-methylpropane sulfonic acid,
ii) and optionally one or more monoethylenically unsaturated comonomers M2 different from monomers M1, such as styrene, C1-C4-alkylacrylates, C1-C4-alkylmethacrylates, acrylamide, methacrylamide, acrylic acid, methacrylic acid, C1-C4-alkylacrylates, C1-C4-alkylmethacrylates.

Especially, the polymeric surfactant A2 comprises or is selected from homo- and copolymers of
i) monomers M1, which is 2-acrylamido-2-methylpropane sulfonic acid,
ii) and optionally one or more monoethylenically unsaturated comonomers M2 different from monomers M1, such as styrene, C1-C4-alkylacrylates, C1-C4-alkylmethacrylates, acrylamide, methacrylamide, acrylic acid, methacrylic acid, C1-C4-alkylacrylates, C1-C4-alkylmethacrylates.

In these preferred, particular preferred or especially preferred polymeric surfactants A.2, the amount of monomers M1 is preferably at least 50% by weight, based on the total amount of monomers forming the polymeric surfactant. Even more preferred are polymeric surfactants A, which are homo- or copolymers of monomers M1, wherein the amount of monomers M1 is at least 90% by weight, based on the total amount of monomers forming the polymeric surfactant. These polymers are known, e.g. from commercially available under the tradenames Lupasol S and Lupasol PA 140.

In another particular group of embodiments, Microparticle compositions according to the invention comprise surfactants of group A3, polymeric surfactants A3 being arylsulfonic acid formaldehyde condensates and arylsulfonic acid formaldehyde urea condensates, in particular from naphthalene sulfonic acid formaldehyde condensates. Examples or polymeric surfactants A3 include arylsulfonic acid formaldehyde condensates and arylsulfonic acid formaldehyde urea condensates, such as naphthalene sulfonic acid formaldehyde condensates, phenol sulfonic acid formaldehyde condensates, cresol sulfonic acid formaldehyde condensates etc.;

In one embodiment microparticle compositions according to the invention comprise at least one surfactant A1 and no surfactant A2 or A3.

In one embodiment microparticle compositions according to the invention comprise at least one surfactant A1, at least one surfactant A2 and no surfactant A3.

In one embodiment microparticle compositions according to the invention comprise at least one surfactant A1, at least one surfactant A3 and no surfactant A2.

In one embodiment microparticle compositions according to the invention comprise at least one surfactant A1, at least one surfactant A2 and at least one surfactant A3.

The amount of the anionic polymeric surfactants A1 to A3 in the composition is preferably from 0.1 to 50% by weight, in particular from 2 to 40% by weight and most preferred from 3 to 30% by weight, based on the total amount of saflufenacil and aminoplast polymer.

Polymeric surfactants A1 to A3 are herein also being referred to polymeric surfactants A.

It was found beneficial, if the polymeric surfactants A1 to A3 is combined with one or more further anionic surfactants B different therefrom, which provide for the stabilization of an aqueous formulation comprising the microparticles. Suitable anionic surface-active compounds B are surfactants having one anionic group, which is selected from phosphate or phosphonate groups and sulfate or sulfonate groups, the latter compounds being preferred. These surfactants B will usually be included into the microparticle composition in the form of their salts, in particular the sodium, potassium or ammonium salts. Examples of anionic surfactants B include the salts of alkyl sulfonates, alkylsulfate, alkyl phosphates, semi-esters of alkoxylated alkanols with sulfuric acid or phosphoric acid, alkylarylsulfonates, alkylaryl phosphates, semi-esters of alkoxylated alkylphenols with sulfuric acid or phosphoric acid and semi-esters of alkoxylated mono-, di- or tristyrylphenols with sulfuric acid or phosphoric acid. Amongst these anionic surfactants B, those of the formula (I) are preferred:

$$R\text{—}(O\text{-}A)_m\text{-}O\text{—}X \qquad (I)$$

wherein
R is a hydrocarbon radical having from 8 to 40 carbon atoms and preferably from 12 to 30 carbon atoms and optionally one oxygen atom;
A is independently from one another 1,2-ethylene, 1,2-propylene or 1,3-propylene, especially 1,2-ethylene;
m is from 0 to 50, preferably from 0 to 30 and especially preferred from 0 to 20; and
X is SO3M or PO3M2 with M being selected from H, alkaline metal ions, such as K and Na, alkaline earth metal ions, such as ½ Ca and ½ Mg and ammonium.

Preferably, M is an alkaline metal ion and especially sodium.

Examples of suitable hydrocarbon radicals R having from 8 to 40 carbon atoms are alkyl having from 8 to 40 and preferably from 12 to 30 carbon atoms, phenyl, which may be substituted with one or two alkyl radicals having from 4 to 20 carbon atoms, phenyl, which is substituted with a phenoxy radical, wherein phenyl and/or phenoxy may contain an alkyl radical having from 4 to 20 carbon atoms, tristyrylphenyl radical etc. In a preferred embodiment of the present invention the radical R in formula I is a tristyrylphenyl radical.

Preference is given to anionic surfactants B which are of the formula (I), wherein R, m and X have the following meanings:
R is alkyl having from 8 to 30, in particular from 10 to 20 carbon atoms,
m is 0,
X is SO3M with m being selected from alkaline metal ions, such as K and Na, alkaline earth metal ions, such as ½ Ca and ½ Mg and ammonium. Preferably, M is an alkaline metal and especially sodium.

Especially preferably, further anionic surfactant B is an alkyl sulfate like lauryl sulfate, especially sodium lauryl sulfate.

If present, the amount of anionic surfactant B, in particular the surface-active compound of the formula (I), is preferably from 0.1 to 10% by weight, in particular from 0.3 to 7% by weight and most preferred from 0.5 to 5% by weight, based on the total amount of saflufenacil and aminoplast polymer. If present, the amount of anionic surfactant B, in particular the surface-active compound of the formula (I), is preferably chosen such that the weight ratio of anionic polymeric surfactant A to anionic surfactant B is from 1:1 to 20:1 in particular from 2:1 to 10:1.

In one embodiment microparticle compositions according to the invention comprise at least one surfactant A1 and no surfactant A2 or A3 and anionic surfactant B is sodium lauryl sulfate.

In one embodiment microparticle compositions according to the invention comprise at least one surfactant A1, at least one surfactant A2 and no surfactant A3 and anionic surfactant B is sodium lauryl sulfate.

In one embodiment microparticle compositions according to the invention comprise at least one surfactant A1, at least one surfactant A3 and no surfactant A2 and anionic surfactant B is sodium lauryl sulfate.

In one embodiment microparticle compositions according to the invention comprise at least one surfactant A1, at least one surfactant A2 and at least one surfactant A3 and anionic surfactant B is sodium lauryl sulfate.

The compositions according to the invention may also contain a nonionic surface-active compound (nonionic surfactant). Preferred nonionic surfactants include the neutral surface-active compounds of the formula (II),

$$R'—(O—B)n—OH \quad (II)$$

wherein
R' is a hydrocarbon radical having from 8 to 40 and more preferably from 12 to 30 carbon atoms and optionally one oxygen atom,
B is C2-C4-alkane-1,2-diyl, such as 1,2-ethylene, 1,2-propylene or 1,2-butylene or a combination thereof and more preferred 1,2-ethylene or a combination thereof with 1,2-propylene, and
n is from 3 to 100, preferably from 4 to 50 and more preferred from 5 to 40.

Preferred nonionic surfactants include block copolymers of ethylene oxide (EO) and propylene oxide (PO). Such block copolymers can for example have the structure R(EO)x-(PO)y-(EO)z, with R being H or a $C_4$ to $C_{30}$ alkyl rest and x, y, z independently being numbers from 2 to 100.

Examples of suitable hydrocarbon radials R' include the radicals mentioned for R. In a preferred embodiment of the invention the radical R' is a phenyl radical being substituted with one C4-C18-alkyl group.

If present, the amount of nonionic surfactant, in particular the surface-active compound of the formula (II), is preferably from 1 to 150 g/L, in particular from 2 to 60 g/L in the final formulation. In one particular embodiment of the invention, the composition does not contain nonionic surfactant or less than 1% by weight of nonionic surfactant, in particular less than 0.5% by weight of nonionic surfactant, based on the total amount of saflufenacil and aminoplast polymer.

In particular groups of embodiments, the microparticle composition is in the form of an aqueous suspension. Such a suspension contains the microparticles of solid saflufenacil as a disperse phase, and an aqueous medium as the continuous phase.

The aqueous suspension may be obtained by the process for preparing the microparticle composition as described herein. It may also be obtained by re-dispersing a solid microparticle composition as described herein in an aqueous medium.

The term "aqueous medium" stands for the liquid phase of the composition and comprises an aqueous solvent and optionally compounds dissolved therein, e.g. surfactants as mentioned above, and if present, conventional one or more conventional formulation additives, such as thickeners or biocides. The aqueous solvent of the aqueous suspension is either water or a mixture thereof with a water-miscible organic solvent, such as C1-C4-alkanols, e.g. methanol, ethanol, n-propanol, isopropanol, n-butanol, 2-butanol, isobutanol, or tert. butanol, C2-05-alkanediols and C3-C8-alkanetriols, preferably from the group consisting of ethylene glycol, 1,2-propanediol, 1,3-propanediol, glycerol and 1,4-butanediol. Generally, the amount of water in the aqueous solvent is at least 50% by weight, in particular at least 80% by weight or at least 90% by weight, based on the aqueous solvent. The aqueous solvent may consist mainly of water, i.e. water makes up at least 95% by weight of the total amount of solvent present in the suspension. The aqueous solvent may also be a mixture of the aforementioned water-miscible organic solvent and water. In the latter case, the weight ratio of water to water-miscible organic solvent in the aqueous solvent preferably is in the range of from 99:1 to 1:1; more preferably in the range of from 50:1 to 3:1; and most preferably in the range of from 20:1 to 4:1. Expressed differently the amount of organic solvent may be from 1 to 50% by weight, more preferably from 2 to 25% by weight, and most preferably from 5 to 20% by weight, based on the total weight of the aqueous solvent.

The aqueous suspension will usually contain the microparticles in an amount of at least 5% by weight and the amount may be as high as 50% by weight or even higher, in each case based on the total weight of the aqueous suspension and calculated as the total amount of aminoplast-polymer and saflufenacil. Frequently, the aqueous suspension will contain the microparticles in an amount from 10 to 45% by weight, in particular from 20 to 40% by weight, in each case based on the total weight of the aqueous suspension and calculated as the total amount of aminoplast-polymer and saflufenacil. The concentration of saflufenacil in the aqueous suspension will frequently be in the range from 5 to 40% by weight, in particular from 15 to 30% by weight, based on the total weight of the aqueous suspension.

If present, the concentration of the polymeric anionic surfactant A in the aqueous suspension will frequently be in the range from 0.1 to 15% by weight, in particular from 0.2 to 6% by weight, based on the total weight of the aqueous suspension of the microparticles.

If present, the concentration of the anionic surfactant B in the aqueous suspension will frequently be in the range from 0.1 to 15% by weight, in particular from 0.2 to 6% by weight, based on the total weight of the aqueous suspension of the microparticles.

The aqueous compositions according to the invention may also comprise customary formulation auxiliaries, such as viscosity-modifying additives (thickeners), antifoam agents, preservatives, buffers, inorganic dispersants, etc., which are usually employed in aqueous formulations of herbicides. Such auxiliaries may be incorporated into the aqueous suspension after step iii) of the preparation process described herein has been carried out. The amount of additives will generally not exceed 10% by weight, in particular 5% by weight of the total weight of the aqueous suspension. Suitable inorganic dispersants, also termed anticaking agents, for preventing agglutination of the microparticles, are silica (such as, for example Sipernat® 22 from Degussa), alumina, calcium carbonate and the like. In the context of the present invention silica is a preferred inorganic dispersant. The concentration of inorganic dispersants in the final suspension will generally not exceed 2% by weight, based on the total weight of the final suspension, and, if present, it is preferably in the range from 0.01 to 2% by weight, in particular from 0.02 to 1.5% by weight and especially from 0.1 to 1% by weight, based on the total weight of the final formulation.

Suitable thickeners are compounds which affect the flow behavior of the suspension concentrate and may assist in stabilizing the aqueous suspension of the microparticles against caking. Mention may be made, in this connection, for example, of commercial thickeners based on polysaccharides, such as methylcellulose, carboxymethylcellulose, hydroxypropyl cellulose (Klucel® grades), Xanthan Gum (commercially available e.g. as Kelzan® grades from Kelco or Rhodopol® grades from Rhodia), synthetic polymers, such as acrylic acid polymers (Carbopol® grades), polyvinyl alcohol (e.g. Mowiol® and Poval® grades from Kuraray) or polyvinyl pyrrolones, silicic acid or phyllosilicates, such as montmorillonite and bentonites, which may be hydrophobized, (commercially available as Attaclay® grades and Attaflow® grades from BASF SE; or as Veegum® grades and Van Gel® grades from R.T. Vanderbilt). In the context of the present invention, Xanthan Gum is a preferred thickener. The concentration of thickeners in the aqueous suspension will generally not exceed 2% by weight, based on the total weight of the aqueous suspension, and is preferably in the range from 0.01 to 2% by weight, in particular from 0.02 to 1.5% by weight and especially from 0.1 to 1% by weight, based on the total weight of the aqueous suspension or the final formulation, respectively.

Antifoam agents suitable for the compositions according to the invention are, for example, silicone emulsions (such as, for example, Silicone SRE-PFL from Wacker or Rhodorsil® from Bluestar Silicones), polysiloxanes and modified polysiloxanes including polysiloxane blockpolymers such as FoamStar® SI and FoamStar® ST products of BASF SE, long-chain alcohols, fatty acids, organofluorine compounds and mixtures thereof.

Suitable preservatives to prevent microbial spoiling of the compositions of the invention include formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. Commercially available preservatives that are based on isothiazolinones are for example marketed under the trademarks Proxel® (Arch Chemical), Acticide® MBS (Thor Chemie) and Kathon® MK (Rohm & Haas).

If appropriate, the compositions according to the invention, in particular the aqueous suspensions, may comprise buffers to regulate the pH. Examples of buffers are alkali metal salts of weak inorganic or organic acids such as, for example, phosphoric acid, boric acid, acetic acid, propionic acid, citric acid, fumaric acid, tartaric acid, oxalic acid and succinic acid.

In addition, the compositions according to the invention, in particular the aqueous suspensions, can be formulated with conventional binders, for example aqueous polymer dispersions, water-soluble resins, for example water-soluble alkyd resins, or waxes.

The compositions of the invention may also contain one or more adjuvants. Suitable adjuvants are known to skilled persons and include surfactants, crop oil concentrates, spreader-stickers, wetting agents, and penetrants. In other particular groups of embodiments, the microparticle composition is in the form of solid composition. Such a solid composition contains the microparticles of solid saflufenacil, optionally one or more surfactants, in particular the polymeric surfactant A and optionally the anionic surfactant B, and optionally an inert solid carrier material.

The solid compositions may e.g. be redispersible powders, water-dispersible granules wettable powders and the like.

Solid carriers include e.g. mineral earths, such as silicas, silica gels, silicates, talc, kaolin, lime stone, lime, chalk, bole, loess, clay, dolomite, diatomaceous earth, calcium sulfate, magnesium sulfate, magnesium oxide, ground synthetic materials, fertilizers such as ammonium sulfate, ammonium phosphate, ammonium nitrate, ureas, and products of vegetable origin, such as cereal meal, tree bark meal, wood meal and nutshell meal, cellulose powders, or other solid carriers.

The solid compositions according to the invention may also comprise customary formulation auxiliaries, such as antifoam agents, preservatives, buffers, inorganic dispersants, etc., which are usually employed in solid formulations of herbicides. Such auxiliaries may be incorporated into the solid formulation at any conventional stage of their preparation process. The amount of additives will generally not exceed 10% by weight, in particular 5% by weight of the total weight of the solid composition.

The solid composition may be obtained from an aqueous suspension which is primarily formed in the process for preparing the microparticle composition as described herein by removing the aqueous phase from the aqueous suspension. Removal of the aqueous phase can be achieved by either separating the aqueous phase from the solid microparticles, e.g. by centrifugation or filtration. Preferably, the aqueous phase is removed by an evaporation process, such as spray drying or freeze drying.

As outlined above, the process for producing the composition comprises a first step, where an aqueous suspension of saflufenacil particles is provided. For this, solid saflufenacil is suspended in an aqueous solvent, in particular in water. The aqueous solvent may contain one or more surfactants, in particular at least one polymeric surfactant A1, which is assumed to act as a protective colloid, and optionally one or more anionic surfactants B.

Preferably, the particle size of the saflufenacil particles in the aqueous suspension prior to encapsulation is less than 45 μm, in particular it will not exceed 40 μm, preferably not exceed 30 μm and in particular not exceed 25 μm. The particle size given is the so called d90-value. Preferably the active substance particles have an average particle diameter, herein also termed d50-value, ranging from 0.5 to 25 μm, in particular from 1 to 20 μm, especially from 1.5 to 15 μm. The d50-value is defined as the value that is above the diameters of 50% by weight of the particles and below the diameters of 50% by weight of the particles. The d10-value is preferably at least 0.5 μm and may e.g. be in the range from 0.5 μm 10 μm, in particular from 1 to 5 μm. The d90 value as well as the d50 value can be calculated from the particle size distribution of the saflufenacil particles which can be determined by conventional methods such as dynamic or static light-scattering at 25° C. and a concentration in the range of 0.1 to 1% by weight.

It has been found beneficial, if the polycondensation is initiated or effected in the presence of at least one anionic polymeric surfactant A2. Polymeric surfactant A2 will frequently be in the range from 0.1 to 10% by weight, in particular from 1 to 6% by weight, based on the total weight of the aqueous suspension.

It has been found beneficial, if the aqueous suspension of step i) also contains at least one anionic surfactant B, in particular an anionic surfactant which comprises or is selected from the surfactants of the formula (I). If present, the concentration of the anionic surfactant B in the aqueous suspension of step i) will frequently be in the range from 0.01 to 2% by weight, in particular from 0.1 to 1% by weight, based on the total weight of the aqueous suspension.

The aqueous suspension of the saflufenacil particles can be provided by analogy to known methods of preparing aqueous suspensions of saflufenacil, e.g. as described in WO 2011/023759.

In one embodiment, step i) comprises a step i.a) and a step i.b). In step i.a) solid saflufenacil, in particular a crystalline form of saflufenacil, such as saflufenacil anhydrate or one of the hydrate forms, and the aqueous solvent and optionally at least a part of the surfactant are mixed in any conventional mixing device which is capable of providing sufficient shear to form the desired suspension. Suitable mixing devices include in particular high shear mixers, such as Ultra-Turrax apparatus, static mixers, e.g. systems having mixing nozzles, agitator bead mills, colloid mills, cone mills and other homogenizers. In general, the sequence in which the individual components are combined is not critical. It may be advantageous to carry step i.a) out by firstly mixing the aqueous solvent and at least a part of the surfactant, e.g. the surfactant of group A
and optionally the surfactant B, until a homogenous mixture is obtained, and then adding the solid saflufenacil with shear to said homogenous mixture. The mixture obtained from step i.a), i.e. a coarse suspension of saflufenacil in the aqueous solvent, is then subjected in step i.b) to suitable means for reducing the particle size of the saflufenacil particles present in the mixture typically to below 40 µm, preferably to below 30 µm and in particular to below 20 µm (d90-value), e.g. to a particle size (d90) in the range from 0.5 to 15 µm. Step i.b) may be carried out by any physical attrition method, such as grinding, crushing or milling, in particular by wet grinding or wet milling, including e.g. bead milling, hammer milling, jet milling, air classifying milling, pin milling, cryogenic grinding processes and the like. Steps i.a) and i.b) are usually performed subsequently. However, it is also possible to perform these steps together.

In another embodiment of the invention, step i) comprises providing saflufenacil in the form of a powder, wherein the d90 value of the powder particles is below 40 µm and in particular at most 30 µm or at most 20 µm, e.g. the particle size (d90) is in the range from 1 to <40 µm, in particular 1 to 30 µm or 1 to 20 µm. The powder is usually prepared by comminuting the solid saflufenacil, e.g. the anhydrate or the crystalline hydrate, by a conventional dry milling technique, such as air milling, to a powder having the desired particle size. The thus obtained powder is then be suspended in the aqueous solvent or in an aqueous solution of the surfactant of group A and optionally the surfactant B.

In one embodiment, polymeric surfactants A2 are added to the suspension of the saflufenacil provided in step i) before starting or initiating or effecting the polycondensation, in particular before adding the aminoplast pre-condensate thereto. In particular, it may be beneficial to keep the aqueous suspension of saflufenacil, which contains the polymeric surfactant A2, for some time, e.g. for 10 to 180 minutes, before starting the polycondensation, while polymeric surfactant A1 is only added after step i). In step ii), an aminoplast pre-condensate is added to the aqueous suspension of step i), which, upon curing in step iii), forms the solid, water-insoluble aminoplast polymer, which embeds or surrounds the solid saflufenacil particles, because the polycondensation preferentially occurs on the surface of the solid saflufenacil particles.

The amount of aminoplast pre-condensate added in step ii) is chosen such that the desired amount of aminoplast polymer in the final microparticle composition is achieved. In fact, the amount added corresponds to the amount of aminoplast resin in the microparticles, taking into account that the mass is reduced by the amount of water which is formed during the polycondensation, and is usually in the range 0.5 to 40% by weight, in particular from 1 to 35% by weight and especially from 5 to 25% by weight, based on saflufenacil and calculated as organic matter.

Suitable pre-condensates, which can be added in step ii) include pre-condensates of melamine and formaldehyde, including wholly or partially etherified melamine formaldehyde pre-condensates, urea-formaldehyde pre-condensates, thiourea formaldehyde pre-condensates, pre-condensates of melamine, urea and formaldehyde (MUF resins), including mixtures of wholly or partially etherified melamine formaldehyde precondensates and urea-formaldehyde pre-condensates, precondensates of urea and glutaraldehyde, pre-condensates of benzoguanamine and formaldehyde, mixtures of dicyandiamide and formaldehyde and urea-glyoxal polycondensates. Suitable aminoplast pre-condensates for microencapsulation are known and can be found, inter alia, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197. Suitable pre-condensates are commercially available, e. g. Cymel types, such as but not limited to Cymel® 303, 327, 328 or 385 (etherified melamine formaldehyde resins of Cytec), Maprenal® types, such as but not limited to Maprenal® MF 900w/95, MF 915/75IB, MF 920/75WA, MF 921w/85WA, (etherified melamine formaldehyde resins of Ineos), Kauramin® types of BASF SE, such as but not limited to Kauramin® 783, Kauramin® 792 or Kauramin® 753 (melamine formaldehyde resins), Kauramin® 620 or Kauramin® 621 (melamine urea formaldehyde resins), Kaurit® types of BASF SE, such as but not limited to Kaurit® 210, 216, 217 or 220 (urea formaldehyde resins), Luracoll® types such as Luracoll® SD (etherified melamine formaldehyde resins), Luwipal® types such as but not limited to Luwipal® 063, Luwipal® 069 (etherified melamine formaldehyde resins), or Plastopal® types such as but not limited to Plastopal® BTM, Plastopal® BTW (etherified urea formaldehyde resins).

In suitable urea-formaldehyde or thiourea-formaldehyde pre-condensates, the molar ratios of urea or thiourea to formaldehyde are generally in the range from 1:0.8 to 1:4, in particular from 1:1.5 to 1:4, especially from 1:2 to 1:3.5.

In suitable melamine-formaldehyde or melamine-(thio) urea-formaldehyde pre condensates, the molar ratios of melamine to formaldehyde are generally in the range from 1:1.5 to 1:10, in particular from 1:3 to 1:8 preferably 1:4 to 1:6.

In suitable melamine-formaldehyde or melamine-(thio) urea-formaldehyde precondensates, the molar ratios of melamine+urea or thiourea to formaldehyde are generally in the range from 1:0.8 to 1:9, in particular from 1:2 to 1:8 preferably 1:3 to 1:6. The molar ratio of urea or thiourea to melamine is usually in the range from 5:1 to 1:50 and in particular from 30:1 to 1:30.

The pre-condensates may be used in the form of etherified pre-condensates of amino compound and aldehyde. In these etherified pre-condensates the methylol groups formed by the reaction of the amino groups with formaldehyde with an alkanol or an alkane diol, in particular with a C1-C4-alkanol, such as methanol, ethanol, n-propanol or n-butanol, in particular methanol, or a C2-C4-alkandiol, such as ethylene glycol. The degree of etherification of these resins can be adjusted by the molar ratio of amino groups to alkanol which is typically in the range from 10:1 to 1:10, preferably in the range from 2:1 to 1:5.

The pre-condensates are most preferably selected from the group consisting of melamine-formaldehyde resins, including wholly or partially etherified melamine formaldehyde pre-condensates, and urea-formaldehyde pre-condensates and mixtures thereof. Especially, the pre-condensate is a wholly or partially etherified melamine formaldehyde condensate, which may contain small amounts, e.g. 1 to 20 mol.-%, based on melamine, of urea.

Addition of the pre-condensate to the aqueous suspension is normally achieved by adding the pre-condensate in the form of an aqueous or alcoholic solution of the pre-condensate to the aqueous suspension or by mixing suitable amounts of the dissolved pre-condensate. Preferably, suitable mixing devices, such as stirrers or inline-mixers are used in order to achieve a uniform distribution of the pre-condensate in the aqueous suspension. It may be beneficial to add the pre-condensate, preferably in the form of a solution, to the aqueous suspension of saflufenacil with stirring. Preferably, the addition of the pre-condensate is performed under conditions, where the polycondensation reaction is slow or does not occur, e.g. where either the pH of the aqueous suspension at least pH 6, e.g. in the range form pH 6 to pH 10, or where the temperature does not exceed 30° C. or both.

The polycondensation of the aminoplast pre-condensate can be effected or initiated in a well-known manner, e.g. by heating the aqueous suspension to a certain reaction temperature, at a pH, where the polycondensation at the reaction temperature occurs. During the polycondensation, the aminoplast pre-condensate is converted into a water-insoluble aminoplast resin, which precipitates from the aqueous phase and deposits preferably on the surface of the solid saflufenacil particles, thereby embedding or surrounding the solid saflufenacil particles. Thereby, it is possible to a achieve an efficient encapsulation even with small amounts of the aminoplast pre-condensate. Preferably, the polycondensation of the aminoplast is performed at pH of less than pH 6, in particular at a pH of at most pH 5, e.g. in the range of pH 0 to 6, more particularly in the range from pH 1 to 5 or in the range from pH 2 to 4.

The pH of the aqueous suspension is usually adjusted by addition of suitable amounts of an organic or inorganic acid, such as sulfuric acid, hydrochloric acid, phosphoric acid, a carboxylic acid including alkanoic acids, alkane dioic acids or hydroxycarboxylic acids, such as formic acid, acetic acid, propionic acid, oxalic acid, malic acid or citric acid, and alkyl or arylsulfonic acids, such as methane sulfonic acid or toluene sulfonic acid. It is preferred, if at least a portion, in particular the majority of the acid is present in the aqueous suspension, before the aqueous suspension is heated to the reaction temperature.

Preferably, the polycondensation of the aminoplast pre-condensate is performed at elevated temperature, in particular at a temperature of at least 30° C., in particular at least 40° C. or at least 50° C., e.g. at a temperature in the range of 30 to 100° C., in particular in the range of 40 to 95° C. or in the range of 50 to 90° C. It may be possible to effect the start of the polycondensation of the aminoplast at a comparatively low temperature, e.g. a temperature in the range of 30 to 65° C. or 35 to 60° C. and then complete the polycondensation reaction at a higher temperature of e.g. 50 to 100° C. or 60 to 90° C. The time for completing the polycondensation may vary, depending on the reactivity of the pre-condensate, the temperature and the pH of the aqueous suspension and may take from 1 h to 24 h, in particular from 2 to 12 h. Preferably, the polycondensation reaction is at least partly performed at temperatures of at least 50° C., in particular at least 60° C., e.g. for 1 to 8 h at a temperature in the range from 50 to 100° C., in particular 60 to 90° C.

The thus obtained aqueous suspension of the saflufenacil microparticles may be neutralized by the addition of a base. Preferably, the pH of the suspension is adjusted to a pH of at least 6, e.g. a pH in the range of pH 6 to 10, in particular in the range of pH 6.5 to 9.0. In one preferred embodiment the base used is ammonia, especially aqueous ammonia.

From the thus obtained aqueous suspension the microparticles can be isolated, e.g. by filtration or centrifugation, or the aqueous suspension may be spray-dried, granulated or freeze-dried, to obtain a solid composition in the form of a powder or granules. The solid composition may be re-dispersed or formulated by using formulation auxiliaries as described above.

The aqueous suspension may also be used as such or formulated as a liquid formulation, e.g. as a suspension, by using suitable formulation auxiliaries as described above, e.g. such as thickeners, anionic surfactants B, non-ionic surfactants and/or biocides.

The invention also relates to uses of the microparticle composition of the invention for protecting crop plants and to methods of controlling undesired vegetation, which comprise applying the formulations, in diluted or undiluted form, to plants, their environment and/or seeds.

The compositions of the invention provide for a very good control of vegetation in noncrop areas, especially at high application rates. However, generally no higher application rates are required in comparison with conventional formulations of non-encapsulated saflufenacil for achieving similar control.

In crops such as soybean, cotton, oilseed rape, flax, lentils, rice, sugar beet, sunflower, tobacco and cereals, such as, for example maize or wheat, the compositions of the invention are active against broad-leaved weeds and grass weeds and provide for less damage to the crop plants in comparison with conventional formulations of non-encapsulated saflufenacil. This effect is particularly observed at low application rates.

Furthermore, the compositions of the invention provide for long lasting residual activity, which exceeds the residual activity of conventional formulations of non-encapsulated saflufenacil.

The compositions according to the invention have an outstanding herbicidal activity against undesired vegetation, in particular against a broad spectrum of economically important harmful monocotyledonous and dicotyledonous weeds.

Mentioned below are some representatives of monocotyledonous and dicotyledonous weeds, which can be controlled by compositions according to the invention, without the enumeration being a restriction to certain species.

In one embodiment, compositions according to the invention are used to control monocotyledonous weeds.

Examples of monocotyledonous weeds on which compositions of the invention act efficiently are selected from the genera *Hordeum* spp., *Echinochloa* spp., *Poa* spp., *Bromus* spp., *Digitaria* spp., *Eriochloa* spp., *Setaria* spp., *Pennisetum* spp., *Eleusine* spp., *Eragrostis* spp., *Panicum* spp., *Lolium* spp., *Brachiaria* spp., *Leptochloa* spp., *Avena* spp., *Cyperus* spp., *Axonopris* spp., *Sorghum* spp., and *Melinus* spp.

Preferred examples of monocotyledonous weeds on which compositions of the invention act efficiently are selected from the species *Hordeum murinum, Echinochloa crus-galli, Poa annus, Bromus rubens* L., *Bromus rigidus, Bromus secalinus* L., *Digitaria sanguinalis, Digitaria insularis, Eriochloa gracilis, Setaria faberi, Setaria viridis, Pennisetum glaucum, Eleusine indica, Eragrostis pectina-* cea, *Panicum miliaceum, Lolium multiflorum, Brachiaria platyphylla, Leptochloa fusca, Avena fatua, Cyperus compressus, Cyperus esculentes, Axonopris offinis, Sorghum halapense*, and *Melinus repens*.

Especially preferred examples of monocotyledonous weeds on which compositions of the invention act efficiently are selected from the species *Echinochloa* spp., *Digitaria* spp., *Setaria* spp., *Eleusine* spp. and *Brachiarium* spp.

In one embodiment compositions of the invention are used to control dicotyledonous weeds.

Examples of dicotyledonous weeds on which compositions of the invention act efficiently are selected from the genera *Amaranthus* spp., *Erigeron* spp., *Conyza* spp., *Polygonum* spp., *Medicago* spp., *Mollugo* spp., *Cyclospermum* spp., *Stellaria* spp., *Gnaphalium* spp., *Taraxacum* spp., *Oenothera* spp., *Amsinckia* spp., *Erodium* spp., *Erigeron* spp., *Senecio* spp., *Lamium* spp., *Kochia* spp., *Chenopodium* spp., *Lactuca* spp., *Malva* spp., *Ipomoea* spp., *Brassica* spp., *Sinapis* spp., *Urtica* spp., *Sida* spp, *Portulaca* spp., *Richardia* spp., *Ambrosia* spp., *Calandrinia* spp., *Sisymbrium* spp., *Sesbania* spp., *Capsella* spp., *Sonchus* spp., *Euphorbia* spp., *Helianthus* spp., *Coronopus* spp., *Salsola* spp., *Abutilon* spp., *Vicia* spp., *Epilobium* spp., *Cardamine* spp., *Picris* spp., *Trifolium* spp., *Galinsoga* spp., *Epimedium* spp., *Marchantia* spp., *Solanum* spp., *Oxalis* spp., *Metricaria* spp., *Plantago* spp., *Tribulus* spp., *Cenchrus* spp. *Bidens* spp., *Veronica* spp., and *Hypochaeris* spp.

Preferred examples of dicotyledonous weeds on compositions of the invention act efficiently are selected from the species *Amaranthus spinosus, Polygonum convolvulus, Medicago polymorphs, Mollugo verticillata, Cyclospermum leptophyllum, Stellaria media, Gnaphalium purpureum, Taraxacum officinale, Oenothera laciniata, Amsinckia intermedia, Erodium cicutarium, Erodium moschatum, Erigeron bonariensis* (*Conyza bonariensis*), *Senecio vulgaris, Lamium amplexicaule, Erigeron canadensis, Polygonum aviculare, Kochia scoparia, Chenopodium album, Lactuca serriola, Malva parviflora, Malva neglecta, Ipomoea hederacea, Ipomoea lacunose, Brassica nigra, Sinapis arvensis, Urtica dioica, Amaranthus blitoides, Amaranthus retroflexus, Amaranthus hybridus, Amaranthus lividus, Sida spinosa, Portulaca oleracea, Richardia scabra, Ambrosia artemisiifolia, Calandrinia caulescens, Sisymbrium irio, Sesbania exaltata, Capsella bursa pastoris, Sonchus oleraceus, Euphorbia maculate, Helianthus annuus, Coronopus didymus, Salsola tragus, Abutilon theophrasti, Vicia benghalensis* L., *Epilobium paniculatum, Cardamine* spp, *Picris echioides, Trifolium* spp., *Galinsoga* spp., *Epimedium* spp., *Marchantia* spp., *Solanum* spp., *Oxalis* spp., *Metricaria matriccarioides, Plantago* spp., *Tribulus terrestris, Salsola kali, Cenchrus* spp., *Bidens bipinnata, Veronica* spp., and *Hypochaeris radicata*.

Especially preferred examples of dicotyledonous weeds on which compositions of the invention act efficiently are selected from the species *Amaranthus* spp., *Erigeron* spp., *Conyza* spp., *Kochia* spp. and *Abutilon* spp.

Depending on the application method in question, the formulations of the invention can additionally be employed in a further number of crop plants to remove undesired plants. Crops which are suitable are, for example, the following:

*Allium cepa, Ananas comosus, Arachis hypogaea, Asparagus officinalis, Avena sativa, Beta vulgaris* spec. *altissima, Beta vulgaris* spec. *rapa, Brassica napus* var. *napus, Brassica napus* var. *napobrassica, Brassica rapa* var. *silvestris, Brassica oleracea, Brassica nigra, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum*, (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N.rustica*), *Olea europaea, Oryza sativa, Phaseolus lunatus, Phaseolus vulgaris, Picea abies, Pinus* spec., *Pistacia vera, Pisum sativum, Prunus avium, Prunus persica, Pyrus communis, Prunus armeniaca, Prunus cerasus, Prunus dulcis* and *Prunus domestica, Ribes sylvestre, Ricinus communis, Saccharum officinarum, Secale cereale, Sinapis alba, Solanum tuberosum, Sorghum bicolor* (s. *vulgare*), *Theobroma cacao, Trifolium pratense, Triticum aestivum, Triticale, Triticum durum, Vicia faba, Vitis vinifera* and *Zea mays*.

Preferred crops are *Arachis hypogaea, Beta vulgaris* spec. *altissima, Brassica napus* var. *napus, Brassica oleracea, Citrus limon, Citrus sinensis, Coffea arabica* (*Coffea canephora, Coffea liberica*), *Cynodon dactylon, Glycine max, Gossypium hirsutum*, (*Gossypium arboreum, Gossypium herbaceum, Gossypium vitifolium*), *Helianthus annuus, Hordeum vulgare, Juglans regia, Lens culinaris, Linum usitatissimum, Lycopersicon lycopersicum, Malus* spec., *Medicago sativa, Nicotiana tabacum* (*N.rustica*), *Olea europaea, Oryza sativa, Phaseolus lunatus, Phaseolus vulgaris, Pistacia vera, Pisum sativum, Prunus dulcis, Saccharum officinarum, Secale cereale, Solanum tuberosum, Sorghum bicolor* (s. *vulgare*), *Triticale, Triticum aestivum, Triticum durum, Vicia faba, Vitis vinifera* and *Zea mays*.

Especially preferred crops are crops of cereals, corn, soybeans, rice, oilseed rape, cotton, potatoes, peanuts or permanent crops.

In addition, the compositions of the invention can also be used in crops which tolerate the effect of herbicides as the result of breeding, including genetic engineering methods.

Furthermore, the compositions of the invention can also be used in crops which tolerate attack by insects or fungi as the result of breeding, including genetic engineering methods.

Compositions of the invention can also be used in crops which have been modified by mutagenesis or genetic engineering in order to provide a new trait to a plant or to modify an already present trait.

The term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes. Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbiciees: bxn, for tolerance to sulfonylurea herbicides: zm-hra, csrl-2, gm-hra, S4-HrA, for tolerance to ALS inhibitor herbicides: csrl-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHGOJG, HCEM485, VCO-01981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHT0H2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and downregulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of the compounds of formula (I) or formulations or combinations comprising them according to the invention on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, *mycoplasma*, viral or viroid pathogens as well as early vigour, early or delayed ripening, cold or heat tolerance as well as changed amino acid or fatty acid spectrum or content.

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

Furthermore, it has been found that compositions of the invention are also suitable for the defoliation and/or desiccation of plant parts of crops such as cotton, potato, oilseed rape, sunflower, soybean or field beans, in particular cotton. In this regard, formulations and/or combinations for the desiccation and/or defoliation of crops, processes for preparing these formulations and/or combinations and methods for desiccating and/or defoliating plants using compositions of the invention have been found. As desiccants, compositions of the invention are particularly suitable for desiccating the above-ground parts of crop plants such as potato, oilseed rape, sunflower and soybean, but also cereals. This makes possible the fully mechanical harvesting of these important crop plants.

Also of economic interest is to facilitate harvesting, which is made possible by concentrating within a certain period of time the dehiscence, or reduction of adhesion to the tree, in citrus fruit, olives and other species and varieties of pernicious fruit, stone fruit and nuts. The same mechanism, i.e. the promotion of the development of abscission tissue between fruit part or leaf part and shoot part of the plants is also essential for the controlled defoliation of useful plants, in particular cotton.

Moreover, a shortening of the time interval in which the individual cotton plants mature leads to an increased fiber quality after harvesting.

Moreover, it has been found that the compositions of the invention are also suitable for the control of conifers, in particular of conifer seedlings which grow naturally, and specifically for the control of pine seedlings which grow naturally.

In general, the compositions of the invention as described herein are useful for combating undesired vegetation. For this purpose, the compositions may be applied as such or are preferably applied after dilution with water. Preferably, for various purposes of end user application, a so-called aqueous spray-liquor is prepared by diluting the compositions of the present invention with water, e.g. tap water. The spray-liquors may also comprise further constituents in dissolved, emulsified or suspended form, for example fertilizers, active substances of other groups of herbicidal or growth-regulatory active substances, further active substances, for example active substances for controlling animal pests or phytopathogenic fungi or bacteria, furthermore mineral salts which are employed for alleviating nutritional and trace element deficiencies, and nonphytotoxic oils or oil concentrates. As a rule, these constituents are added to the spray mixture before, during or after dilution of the compositions according to the invention.

The compositions of the invention can be applied by the pre-emergence or the postemergence method. If the saflufenacil is less well tolerated by certain crop plants, application techniques may be employed where the herbicidal compositions are sprayed, with the aid of the spraying apparatus, in such a way that the leaves of the sensitive crop plants ideally do not come into contact with them, while the active substances reach the leaves of undesired plants which grow underneath, or the bare soil surface (post-directed, lay-by).

Depending on the aim of the control measures, the season, the target plants and the growth stage, the compositions of the invention are applied to such a degree that the application rates of saflufenacil are from 0.001 to 3.0, preferably from 0.01 to 1.0 kg/ha active substance (a.s.).

To widen the spectrum of action and to obtain synergistic effects, the compositions of the invention can be mixed with a large number of representatives of other groups of herbicidal or growth-regulatory active substances and applied together with these. Examples of suitable mixing partners are 1,2,4-thiadiazoles, 1,3,4-thiadiazoles, amides, amino phosphoric acid and its derivatives, amino triazoles, anilides, aryloxy/heteroaryloxyalkanoic acids and their derivatives, benzoic acid and its derivatives, benzothia diazinones, 2-(hetaroyl/aroyl)-1,3-cyclohexanediones, heteroaryl aryl ketones, benzylisoxazolidinones, meta-CF3-phenyl derivatives, carbamates, quinolinecarboxylic acid and its derivatives, chloroacetanilides, cyclohexenone oxime ether derivatives, diazines, dichloropropionic acid and its derivatives, dihydrobenzofurans, dihydrofuran-3-ones, dinitroanilines, dinitrophenols, diphenyl ethers, dipyridyls, halocarboxylic acids and their derivatives, ureas, 3-phenyluracils, imidazoles, imidazolinones, N-phenyl3,4,5,6-tetrahydrophthalimides, oxadiazoles, oxiranes, phenols, aryloxy- and heteroaryloxyphenoxypropionic acid esters, phenylacetic acid and its derivatives, 2-phenylpropionic acid and its derivatives, pyrazoles, phenylpyrazoles, pyridazines, pyridine carboxylic acid and its derivatives, pyrimidyl ethers, sulfonamides, sulfonylureas, triazines, triazinones, triazolinones, triazolecarboxamides and uracils.

It is of also possible to use the compositions of the present invention as a tank-mix partner with other formulations. Thus, the compositions of the invention can be mixed and applied together with a large number of different pesticide compound formulations, for example those that include active ingredients or adjuvants, such as atrazine, glyphosate, glufosinate, S-metolachlor, 2,4-D ester, isoxaflutole, diflufenzopyr, dicamba, mesotrione, dimethenamid-P, pendimethalin, imazethapyr, paraffin oils, polyol fatty acid esters, polyethoxylated polyol fatty acid esters, ethoxylated alkyl aryl phosphates, methylated seed oils, emulsifiers, ammonium sulfate or mixtures thereof.

Moreover, it may be useful to apply the saflufenacil-containing compositions of the invention, separately or in combination with other herbicides, jointly as a mixture with yet further plant protection agents, for example with agents for controlling pests or phytopathogenic fungi or bacteria. Also of interest is the miscibility with mineral salt solutions which are employed for alleviating nutritional and trace element deficiencies. Nonphytotoxic oils and oil concentrates may also be added.

The present invention offers the following advantages:

It is easy and economical to carry out.

Compositions according to the invention are compatible with a broad range of other pesticides and formulations thereof, in particular herbicides with a solubility in water of at least one g/l, such as auxins, bentazone, diquat and paraquat and their formulations. In particular, the compatibility with dicamba, glyphosate, glufosinate, MCPA, 2,4-dichlorophenoxyacetic acid, 2,4,5-Trichlorophenoxyacetic acid, bentazone, diquat and paraquat and their formulations is achieved.

Compositions according to the invention show both high physical and chemical stability over prolonged storage periods while maintaining their biological efficacy.

Upon dilution with water, the compositions according to the invention give stable aqueous compositions of saflufenacil and form no or only little coarse material or supernatant liquid.

The following examples are intended to further illustrate the present invention without limiting its scope in any way.

EXAMPLES

I. Analytics:

Particle size Distribution (PSD) was determined by statistic laser scattering using a Malvern Mastersizer 200 according to European norm ISO 13320 EN. The data were treated according to the Mie-Theory by software using a "universal model" provided by Malvern Instruments. Important parameters are the dn-values for n=10, 50 and 90, the d10, d50 and d90.

Solid content of the final dispersion was measured by evaporating the volatiles of small probe of the aqueous suspension in an oven at 105° C. for 2 hours. The value indicated for the examples is an average value from three parallel experiments.

II. Ingredients:
Defoamer 1: defoamer based on a silicone oil emulsion
Defoamer 2: antifoam emulsion comprising polydimethylsiloxane
Biocide 1: aqueous biocidal formulation comprising Methylisothiazolinone and Chlor-methylisothiazolinone
Biocide 2: glycol based biocidal formulation comprising Benzisothiazolinone
Biocide 3: biocidal formulation comprising 2-Bromo-2-nitropropane-1,3-diol
Xanthan Gum
Adjuvant 1: methylated seed oil, alkylphenol ethoxylate
Nonionic Surfactant 1: nonionic surfactant comprising tristyrylphenol alkoxylate
Nonionic Surfactant 2: nonionic surfactant of the type PEO-PPO-PEO, Mw of the PPO block 3250 g/mol, percentage of polyethylenglycol on molecule 50 wt %
Anionic Surfactant A1-1: Sodium lignosulfonate, see table 1
Anionic Surfactant A1-2: Sodium lignosulfonate, see table 1
Anionic Surfactant A1-3: lignin, sulfomethylated, see table 1
Anionic Surfactant A1-4: Sodium lignosulfonate, see table 1
Anionic Surfactant A1-5: Sodium lignosulfonate, see table 1
Surfactant A2-1: 20% aqueous solution of poly(2-acrylamido-2-methylpropane sulfonic acid) sodium salt with pH 2.5-4; (CAS 55141-01-0 or 35641-59-9)
Pre-condensate P1: 70% w/w aqueous solution of etherified melamine formaldehyde pre-condensate, CAS 68002-20-0
Roundup® Powermax II Herbicide: commercially available aqueous solution of glyphosate potassium, content 540 grams of glyphosate per liter (calculated as glyphosate acid)
Engenia® Herbicide: commercially available aqueous solution of the N,N,Bis-(3-aminopylamine)methylamine salt of dicamba, content 600 grams of glyphosate per liter (calculated as dicamba acid)
Roundup WeatherMAX Herbicide: commercially available aqueous solution of glyphosate potassium, content 540 grams of glyphosate per liter (calculated as glyphosate acid)
Honcho® plus Herbicide commercially available aqueous solution of the isopropyl ammonium salt of glyphosate, content 356 grams of glyphosate per liter (calculated as glyphosate acid)

III. Preparation of the Compositions of the Invention:

a) Suspension Premix 4.1 kg saflufenacil tgai (97.5% purity) was subjected to bead milling in an aqueous phase containing 80 g sodium lauryl sulfate, 8.0 g of Biocide 1, 16.0 g of Biocide 2 and 6.4 g of Biocide 3, respectively, 4.0 g Defoamer 1, 4.5 g citric acid and 3.78 kg water until the particle size has reached a d50 of 1.1 μm according to static laser scattering. (Equipment: Malvern 3000, software: V3.63, scattering model: Fraunhofer, analysis model: universal)

b) Capsule Premix 280 g of above suspension premix was mixed with 52 g of a 20 w % solution of Surfactant A2-1, then 59 g of Precondensate P1, and finally 32 g of a 10 w % aqueous solution of citric acid. This premix was heated to +80° C. upon stirring, kept at +80° C. for 2 hours, then cooled to room temperature. A microcapsule suspension with d50=4.6 μm resulted (Equipment: Malvern 3000, software: V3.63, scattering model: Fraunhofer, analysis model: universal)

c) Capsule Formulation

To 10 g of above capsule premix was added 0.5 g polymeric surfactant according to the following table and the suspension equilibrated by stirring for 30 minutes. Five stabilized capsule formulations, CS1 to CS5, resulted.

TABLE 1 properties of Anionic Surfactants A1-1 to A1-5

| Example | Dispersing agent | Mw [g/mol] | Degree of sulfo-nation [mol SO3/kg lignosulfonate] | Inventive/ comparison |
|---------|------------------|------------|-----------------------------------------------------|----------------------|
| CS1 | Anionic Surfactant A1-1 | 43,000 | 1.9 | inventive |
| CS2 | Anionic Surfactant A1-2 | 65,000 | 1.7 | inventive |
| CS3 | Anionic Surfactant A1-3 | 10,200 | 1.5 | inventive |
| CS4 | Anionic Surfactant A1-4 | 3,100 | 2.9 | comparison |
| CS5 | Anionic Surfactant A1-5 | 6,200 | 0.7 | comparison | d) Miscibility Tests

To simulate tank-mixing by a farmer, 0.7 g of above CS1 to CS5 each were dispersed in 100 ml CIPAC D water, then 2.1 ml of Roundup Powermax II Herbicide was added, shaken and the mixture allowed to age for 24 hours. Subsequently, the fluid was poured onto a 150 μm sieve, and the residue left on the sieve judged visually.

| Capsule formulation | Sieve residues | Conclusion |
|---------------------|----------------|------------|
| CS1 | traces | miscible with glyphosate, applicable |
| CS2 | nil | miscible with glyphosate, applicable |
| CS3 | traces | miscible with glyphosate, applicable |
| CS4 | large residue | Incompatible with glyphosate, not applicable |
| CS5 | large residue | Incompatible with glyphosate, not applicable | e) Final Confirmation of Compatibility
Capsule Formulation CS6:

700 g of the capsule premix described in paragraph b) were finished with 1.6 g Biocide 2, 0.6 g Biocide 3, 0.8 g Biocide 1, 4.2 g Defoamer 2, 25 g Nonionic Surfactant 2, 50 g Anionic Surfactant A1-3, 2.5 g Xanthan, 35 g ammonium acetate, 24 g 25% aqueous ammonia, and 260 g water to form saflufenacil formulation CS6.

Formulation CS6 was dispersed in 100 g CIPAC D water and test additives added according to the following table, then the aqueous suspensions could age for 2 hours, and were finally poured onto a 150 μm sieve. Again, the residue left on the sieve was judged visually.

| Run | CS6 [g] | Additive 1 | [g] | Additive 2 | [g] | Sieve residue |
|---|---|---|---|---|---|---|
| 1 | 0.7 | Roundup Powermax II Herbicide | 3.2 | — | — | traces |
| 2 | 0.7 | Roundup Powermax II Herbicide | 3.2 | Adjuvant 1 (NH4)2SO4 | 0.9 1.0 | traces |
| 3 | 0.7 | Engenia Herbicide | 1.2 | — | — | traces |
| 4 | 0.7 | Engenia Herbicide | 1.2 | Adjuvant 1 (NH4)2SO4 | 0.9 1.0 | nil |
| 5 | 1.0 | Roundup WeatherMAX Herbicide | 3.2 | — | — | nil |
| 6 | 1.0 | Roundup WeatherMAX Herbicide | 3.2 | Adjuvant 1 (NH4)2SO4 | 0.9 1.0 | nil |
| 7 | 1.0 | Honcho plus Herbicide | 4.1 | — | — | nil |
| 8 | 1.0 | Honcho plus Herbicide | 4.1 | Adjuvant 1 (NH4)2SO4 | 0.9 1.0 | nil | f) Capsule formulation CS7:

700 g of the capsule premix described in paragraph b) were finished with 1.6 g Biocide 2, 0.6 g Biocide 3, 0.8 g Biocide 1, 4.2 g Defoamer 2, 25 g Nonionic Surfactant 1, 50 g Anionic Surfactant A1-2, 2.5 g Xanthan, 35 g ammonium acetate, 24 g 25% aqueous ammonia, and 260 g water to form saflufenacil formulation CS7.

Formulation CS7 was dispersed in 100 g CIPAC D water and test additives added according to the following table, then the aqueous suspensions could age for 2 hours, and were finally poured onto a 150 μm sieve. Again, the residue left on the sieve was judged visually.

| Run | CS7 [g] | Additive 1 | [g] | Additive 2 | [g] | Sieve residue |
|---|---|---|---|---|---|---|
| 1 | 0.7 | Roundup Powermax II Herbicide | 3.2 | — | — | nil |
| 2 | 0.7 | Roundup Powermax II Herbicide | 3.2 | Adjuvant 1 (NH4)2SO4 | 0.9 1.0 | traces |
| 3 | 0.7 | Engenia Herbicide | 1.2 | — | — | traces |
| 4 | 0.7 | Engenia Herbicide | 1.2 | Adjuvant 1 (NH4)2SO4 | 0.9 1.0 | nil |
| 5 | 1.0 | Roundup WeatherMAX Herbicide | 3.2 | — | — | nil |
| 6 | 1.0 | Roundup WeatherMAX Herbicide | 3.2 | Adjuvant 1 (NH4)2SO4 | 0.9 1.0 | nil |
| 7 | 1.0 | Honcho plus Herbicide | 4.1 | — | — | traces |
| 8 | 1.0 | Honcho plus Herbicide | 4.1 | Adjuvant 1 (NH4)2SO4 | 0.9 1.0 | traces | g) Capsule formulation CS8:

700 g of the capsule premix described in paragraph b) were finished with 1.6 g Biocide 2, 0.6 g Biocide 3, 0.8 g Biocide 1, 4.2 g Defoamer 2, 25 g Nonionic Surfactant 2, 50 g Anionic Surfactant A1-1, 2.5 g Xanthan, 35 g ammonium acetate, 24 g 25% aqueous ammonia, and 260 g water to form saflufenacil formulation CS8.

Formulation CS8 was dispersed in 100 g CIPAC D water and test additives added according to the following table, then the aqueous suspensions could age for 2 hours, and were finally poured onto a 150 μm sieve. Again, the residue left on the sieve was judged visually.

| Run | CS8 [g] | Additive 1 | [g] | Additive 2 | [g] | Sieve residue |
|---|---|---|---|---|---|---|
| 1 | 0.7 | Roundup Powermax II Herbicide | 3.2 | — | — | traces |
| 2 | 0.7 | Roundup Powermax II Herbicide | 3.2 | Adjuvant 1 (NH4)2SO4 | 0.9 1.0 | traces |
| 3 | 0.7 | Engenia Herbicide | 1.2 | — | — | nil |
| 4 | 0.7 | Engenia Herbicide | 1.2 | Adjuvant 1 (NH4)2SO4 | 0.9 1.0 | traces |
| 5 | 1.0 | Roundup WeatherMAX Herbicide | 3.2 | — | — | nil |
| 6 | 1.0 | Roundup WeatherMAX Herbicide | 3.2 | Adjuvant 1 (NH4)2SO4 | 0.9 1.0 | traces |
| 7 | 1.0 | Honcho plus Herbicide | 4.1 | — | — | traces |
| 8 | 1.0 | Honcho plus Herbicide | 4.1 | Adjuvant 1 (NH4)2SO4 | 0.9 1.0 | traces |

The invention claimed is:

1. A microparticle composition comprising saflufenacil, wherein saflufenacil is present in the form of microparticles, which comprise solid saflufenacil, which is surrounded or embedded by an aminoplast polymer, which is a polycondensation product of one or more amino compounds and one or more aldehydes, and further comprising at least one lignin based sulfonic acid A, wherein said lignosulfonic acid A has an average molar weight MW of at least 10,000 Da and a degree of sulfonation from 1.0 to 2.5 mol per kilogram of said lignosulfonic acid A, and wherein the aminoplast polymer is selected from the group consisting of melamine formaldehyde resins, urea formaldehyde resins, and mixtures thereof.

2. The composition of claim 1, wherein said at least one lignin based sulfonic acid A is selected from the group consisting of lignosulfonic acid and ethoxylated lignosulfonic acid.

3. The composition of claim 1, further comprising at least one anionic surfactant A2, anionic surfactant A2 being homo- or copolymers of monoethylenically unsaturated monomers M1 having a sulfonic acid group optionally with one or more comonomers M2 different from monomers M1.

4. The composition of claim 1, further comprising an alkyl sulfate.

5. The composition of claim 1, wherein the aminoplast polymer is a melamine formaldehyde resin.

6. The composition of claim 1, wherein the microparticles have a weight average particle diameter d50 in the range from 1 to 25 μm, as determined by dynamic light scattering of an aqueous dispersion of the microcapsules.

7. The composition of claim 1, wherein the microparticles comprise less than 10% by weight of particles having a particle diameter of more than 50 μm, as determined by dynamic light scattering of an aqueous dispersion of the microcapsules.

8. The composition of claim 1, which is an aqueous suspension of the microparticles.

9. The composition of claim 1, which is solid composition of the microparticles.

10. The composition of claim 1, which contains one or more auxiliaries conventionally employed for the formulation of plant protection compositions.

11. The composition of claim 1, wherein an amount of aminoplast polymer in the microparticle composition is from 0.5 to 40% by weight, based on the total weight of aminoplast polymer and saflufenacil.

12. The composition of claim 11 wherein the amount of aminoplast polymer in the microparticle composition is from 1 to 35% by weight, based on the total weight of the aminoplast polymer and saflufenacil.

13. The composition of claim 11 wherein the amount of aminoplast polymer in the microparticle composition is from 5 to 25% by weight, based on the total weight of the aminoplast polymer and saflufenacil.

14. A method for producing the composition of claim 1 comprising:
   i) providing an aqueous suspension or dispersion of solid saflufenacil particles;
   ii) adding an aminoplast pre-condensate to the aqueous suspension;
   iii) effecting the polycondensation of the aminoplast pre-condensate.

15. The method of claim 14, where the saflufenacil particles in the aqueous suspension dispersion have a weight average particle diameter d50 in the range from 0.5 to 25 µm, as determined by dynamic light scattering.

16. A method of controlling undesired vegetation, wherein a microparticle composition of claim 1 is allowed to act on plants, their environment and/or on seeds.

* * * * *